United States Patent [19]

Birukawa et al.

[11] Patent Number: 5,341,359
[45] Date of Patent: Aug. 23, 1994

[54] ABNORMALITY DETECTION OF A RECORDING MEDIUM IN A MAGNETO-OPTICAL RECORDING SYSTEM

[75] Inventors: Masahiro Birukawa, Hirakata; Norio Miyatake, Kobe; Yasumori Hino, Neyagawa, all of Japan

[73] Assignee: Matsushita Electric Industrial Co., Ltd., Osaka, Japan

[21] Appl. No.: 946,525

[22] Filed: Sep. 16, 1992

[30] Foreign Application Priority Data

Sep. 17, 1991 [JP] Japan ................... 3-236060

[51] Int. Cl.⁵ .................... G11B 11/10; G11B 27/36
[52] U.S. Cl. .................... 369/107; 369/13; 369/54; 369/58
[58] Field of Search ........... 369/58, 54, 107, 275.3, 369/47, 110, 13

[56] References Cited

U.S. PATENT DOCUMENTS

| | | | |
|---|---|---|---|
| 4,768,181 | 8/1988 | Ichinose et al. | 369/54 |
| 4,980,878 | 12/1990 | Szerlip | 369/54 |
| 5,018,126 | 5/1991 | Kulakowski et al. | 369/58 |
| 5,020,041 | 5/1992 | Nakao et al. | 369/13 |
| 5,042,020 | 8/1992 | Endo | 369/58 |
| 5,132,956 | 7/1992 | Ichikawa | 369/54 |
| 5,189,650 | 2/1993 | Watanabe et al. | 369/110 |
| 5,204,847 | 4/1993 | Tayefeh | 369/58 |
| 5,224,087 | 6/1993 | Maeda et al. | 369/54 |

FOREIGN PATENT DOCUMENTS

| | | |
|---|---|---|
| 62-175948 | 8/1987 | Japan . |
| 62-252552 | 11/1987 | Japan . |
| 2-139738 | 5/1990 | Japan . |
| 2-302952 | 12/1990 | Japan . |
| 3-214448 | 9/1991 | Japan . |

Primary Examiner—Paul M. Dzierzynski
Assistant Examiner—Kim-Kwok Chu
Attorney, Agent, or Firm—Ratner & Prestia

[57] ABSTRACT

A magneto-optical recording and/or reading-out apparatus can record and read out information on and from a magneto-optical recording medium by the use of a laser beam. The apparatus includes a reflected beam detector, a comparator operatively coupled with the reflected beam detector, and a judgment unit operatively coupled with the comparator. The reflected beam detector detects the quantity of a laser beam reflected from the magneto-optical recording medium during recording. The comparator compares the quantity of the reflected laser beam with at least one reference value during the recording, thereby detecting an abnormality in the reflected laser beam. The judgment unit judges whether an area of the magneto-optical recording medium which has caused the abnormality is practically usable, in accordance with an output from the comparator and data to be recorded on this area.

17 Claims, 5 Drawing Sheets

ABNORMALITY DETECTION OF A RECORDING MEDIUM IN A MAGNETO-OPTICAL RECORDING SYSTEM

BACKGROUND OF THE INVENTION

1. Field of the Invention

The present invention relates to a magneto-optical recording and/or reading-out apparatus.

2. Description of the Prior

As one of rewritable optical recording mediums, a magneto-optical disc is well known in the art. The magneto-optical disc now available in the market is recorded with information by a method in which, while the magneto-optical disc is rotated in one direction in the presence of a bias magnetic field of a predetermined intensity, a laser beam modulated according to a signal to be recorded is irradiated onto the magneto-optical disc. During the practice of this method, a magnetization of a portion of the magneto-optical disc where a high-power laser beam is irradiated is oriented in a direction conforming to the direction of the bias magnetic field whereas a magnetization of a portion of the magneto-optical disc where a low-power laser beam having a zero or quasi-zero power is irradiated remains changed. In view of this, preparatory to an actual information recording on the magneto-optical disc, the magneto-optical disc must magnetized in a direction counter to the direction of magnetization which takes place during the information recording. This preparatory procedure is known as an erasure which is generally carried out by irradiating a laser beam of a predetermined intensity in the presence of a predetermined magnetic field oriented in a direction counter to the direction of the orientated magnetization which will be established after the information recording on the magneto-optical disc.

As is well known to those skilled in the art, completely flawless magneto-optical discs are not available and most of magneto-optical discs more or less contain defects. Because of this, data recorded on the magneto-optical disc need be read out for verification purpose and then checked to see if an error correction is possible. A process of verification is such that, in the event of an occurrence such an error of a kind that no error correction is a remedy, data to be recorded on that area of the magneto-optical disc where the error has occurred can be recorded on an alternative or replacement area to ensure an accurate information recording or readout.

Accordingly, it is usual for data to be recorded on the magneto-optical disc through the following process.

1) A seeking motion to an address on the magneto-optical disc where they are to be recorded.

2) An erasure of a track region where the recording is to be made.

3) Recording the data on the magneto-optical disc.

4) Verification of the data recorded on the magneto-optical disc.

5) Depending on a result of the verification, an erasure of the alternative or replacement area or re-recording of the data on the magneto-optical disc, followed by a verification of the re-recorded data.

This process sequence is problematic in that a relatively long time is required in making the recording.

In order to eliminate the above discussed problem, an over-write technique in which a data erasure is followed immediately by a data recording is currently known. This over-write technique includes a method such as disclosed in, for example, U.S. Pat. No. 5,020,041 wherein the data recording on the magneto-optical disc is carried out by means of a magnetic field modulated according to a signal to be recorded while being radiated by a laser beam of a predetermined power. Japanese Laid-open Patent Publication (unexamined) No. 62-175948 discloses another method wherein, during the recording, the intensity of the laser beam is modulated according to a signal to be recorded in the presence of a bias magnetic field of a predetermined intensity. Both of these methods requires no erasure process because of the capability of data overwriting and, hence, the following process sequence suffices to accomplish the data recording.

1) A seeking motion to an address on the magneto-optical disc where data are to be recorded.

2) Recording the data on the magneto-optical disc.

3) Verification of the data recorded on the magneto-optical disc.

4) Depending on a result of the verification, an erasure of the alternative or replacement area or re-recording of the data on the magneto-optical disc, followed by a verification of the re-recorded data.

Alternative to the above discussed over-write technique, a technique is also suggested in which the use is made of two optical recording heads, either separate or integrated, so that, while the recording is made by means of one of the optical recording heads, the other of the optical recording heads is used to read out data for verification purpose, such as disclosed in, for example, Japanese Laid-open Patent Publication (unexamined) No. 62-252,552.

According to this publication, the recording completes during each process of making an access to the address where the recording is to be made, erasure of the track on which the recording is to be made and recording of data, or, where the necessity arises, erasing and re-recording onto an alternative area based on a result of verification which is carried out simultaneously with the recording.

However, since with the first mentioned method the erasure takes place simultaneously with the recording and the verification need be performed subsequently, there is a problem in that the length of time that can be reduced is very small.

According to the second mentioned method, the verification takes place simultaneously with the recording and the erasure need be performed before the recording, and therefore, in addition to the problem in that the length of time that can be reduced is very small, there is another problem in that the control of the two lasers requires the optical head to be complicated in structure and expensive to manufacture.

Japanese Laid-open Patent Publication (unexamined) No. 2-139738 discloses a method wherein the first and second mentioned methods are combined. According to this disclosure, while two lasers are mounted on separate or integrated optical heads, a defect is detected simultaneously with the erasure by sensing an abnormality in the light reflected from the magneto-optical disc so that the recording according to a signal to be recorded can be performed by means of the modulated second laser beam without the verification being performed. According to this method, the erasure, the recording and the verification are accomplished substantially simultaneously, and the length of time required to complete the recording can be reduced since the recording can be completed by making an access to the address where data are to be recorded, and the recording of the data or, where the necessity arises, the re-recording of the data in an alternative area based on a result of the verification. However, there is a problem in that the control of the two lasers renders the optical heads to be complicated in structure and difficult or expensive to manufacture. At the same time, since the laser used to record the data and the laser used to detect the defect are installed at different positions, respectively, the position where the data are to be recorded and the position at which the defect detection is made are different from each other. While a correction for this difference may be accomplished naturally by the use of a delay circuit or the like, any possible presence of a variation in rotational speed brings about a problem in that the position where the defect is found in the time-shared data cannot be located.

SUMMARY OF THE INVENTION

The present invention has been developed to overcome the above-described disadvantages found in the prior art methods and is intended to provide the accomplishment of a detection of bad sectors simultaneously with an over-writing process with the use of a simple optical head easy to manufacture, that is, with the use of a single laser beam as is the case in the prior art.

It is accordingly an object of the present invention to provide an improved magneto-optical recording and/or reading-out apparatus which is capable of performing a series of recording operation in an extremely reduced length of time. The apparatus according to the present invention is effective to provide an effect similar to that afforded by the verification simultaneously with the over-writing. Also, since the position where a defect exists is detected by means of a recording beam while the recording is performed, the position where the data are recorded completely matches with the position where the defect is located. Accordingly, by detecting the presence of the defect with reference to the data being recorded, it is possible to determine whether or not an error correction is possible.

Figure 1:
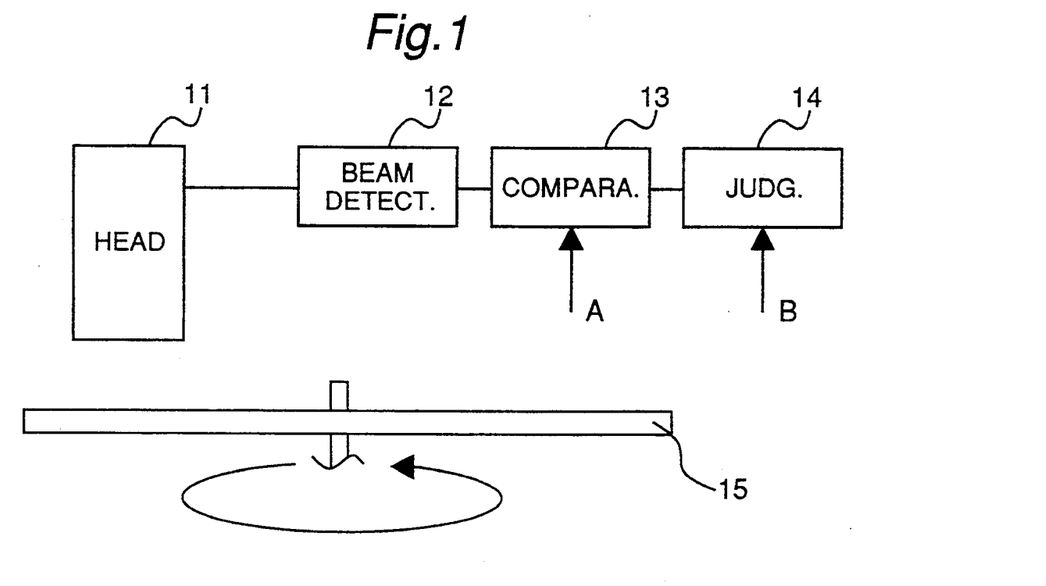
FIG. 1 is a schematic block diagram of a magneto-optical recording and/or reading-out apparatus according to the present invention.

In accomplishing the above and other objects, the magneto-optical recording and/or reading-out apparatus according to the present invention generally comprises an optical head 11, a reflected beam detector 12 operatively coupled with the optical head 11, a comparator 13 operatively coupled with the reflected beam detector 12, and a judgment means 14 operatively coupled with the comparator 13, as shown in FIG. 1. The reflected beam detector 12 detects the quantity of a laser beam reflected from a magneto-optical recording medium 15 during recording. The comparator 13 compares the level of the reflected laser beam with at least one reference value A inputted thereto during the recording, thereby detecting an abnormality in the reflected laser beam. The judgment means 14 judges whether an area of the magneto-optical recording medium which has caused the abnormality is practically usable, in accordance with an output from the comparator 13 and data B to be recorded on said area.

The magneto-optical recording and/or reading-out apparatus having the above-described construction can monitor the reflected laser beam from the magneto-optical recording medium 15 during the recording. In the event that the magneto-optical recording medium 15 contains a defect, the level of the reflected laser beam varies during the recording. The comparator 13 can recognize the presence or absence of the defect using the reference value A inputted thereinto.

Preferably, to the comparator 13 are inputted two reference values: a first reference value somewhat lower than the level of the reflected laser beam determined by the amount of light incident upon the magneto-optical recording medium 15 and the reflectance of the magneto-optical recording medium 15, and a second reference value somewhat higher than such level. Of the two, it is important to know of the presence of the defect by the use of the first reference value.

At this time, since the recording takes place simultaneously, a comparison with the data to be recorded can provide an indication of where the defect is located in one area. For example, when the one area is a sector, it can be known as to whether the defect is located at a VFO area necessary to extract a synchronizing clock, a sync area, a resync area or a data area. In view of this, the use is recommended of criterions for the determination of whether or not the sector can be used in practice because of the defect (for example, the criterions for the determination of whether or not a latter half of the VFO area contains a defect of 2 or more bytes in size, whether or not the sync area contains a defect of 8 or more bits in size, whether or not at least two consecutive resync areas contain defects, or whether or not the data area contains a defect of 15 or more bytes in succession), so that the judgment means 14 operable to determine the presence or absence of the defect by comparing an output from the comparator 13 with the criterions and the signal being recorded can determine whether or not the sector containing the defect is utilized while the recording is performed. In addition, by the provision of a memory, when the sector containing the defect cannot be used in practice, the address number thereof can be sequentially stored in the memory. After the complete recording has been made, the data recorded in the sector which is not suited for use are recorded again in an alternative sector.

Where the strict criterions are employed, it is possible to omit the verification of most of the sectors by classifying the sectors into sectors which would pose no problem when in use and sectors which would pose a problem when in use, for example, by allowing only some of the sectors which are questionable to be verified or by treating all of the questionable sectors as bad sectors.

As hereinbefore described, the employment of the comparator and the judgement means, coupled with the reflected beam detector following the optical head, makes it possible to determine the acceptability of the sector during the recording with no need to perform the verification or with the verification performed only in seldom cases. Consequently, in contrast to the prior art which requires two steps of overwriting and verifying during the recording, the present invention requires only one step of over-writing to be performed to give rise to effects similar to those afforded by the prior art. This results in a reduction in time required to accomplish the recording, excluding an access time, to a value which is generally one half that required according to the prior art.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein.

DETAILED DESCRIPTION OF THE EMBODIMENTS

Referring now to the drawings, there is schematically shown in FIG. 1 a magneto-optical recording and/or reading-out apparatus according to the present invention. The apparatus of FIG. 1 generally comprises an optical head 11, a reflected beam detector 12 operatively coupled with the optical head 11, a comparator 13 operatively coupled with the reflected beam detector 12, and a judgment means 14 operatively coupled with the comparator 13. The reflected beam detector 12 detects the quantity of a laser beam reflected from a magneto-optical disc 15 during recording. The comparator 13 compares the level of the reflected laser beam with at least one reference value A inputted thereto during the recording, thereby detecting an abnormality in the reflected laser beam. The judgment means 14 judges whether an area of the magneto-optical disc 15 which has caused the abnormality is practically usable, in accordance with an output from the comparator 13 and data B to be recorded on said area.

Figure 2:
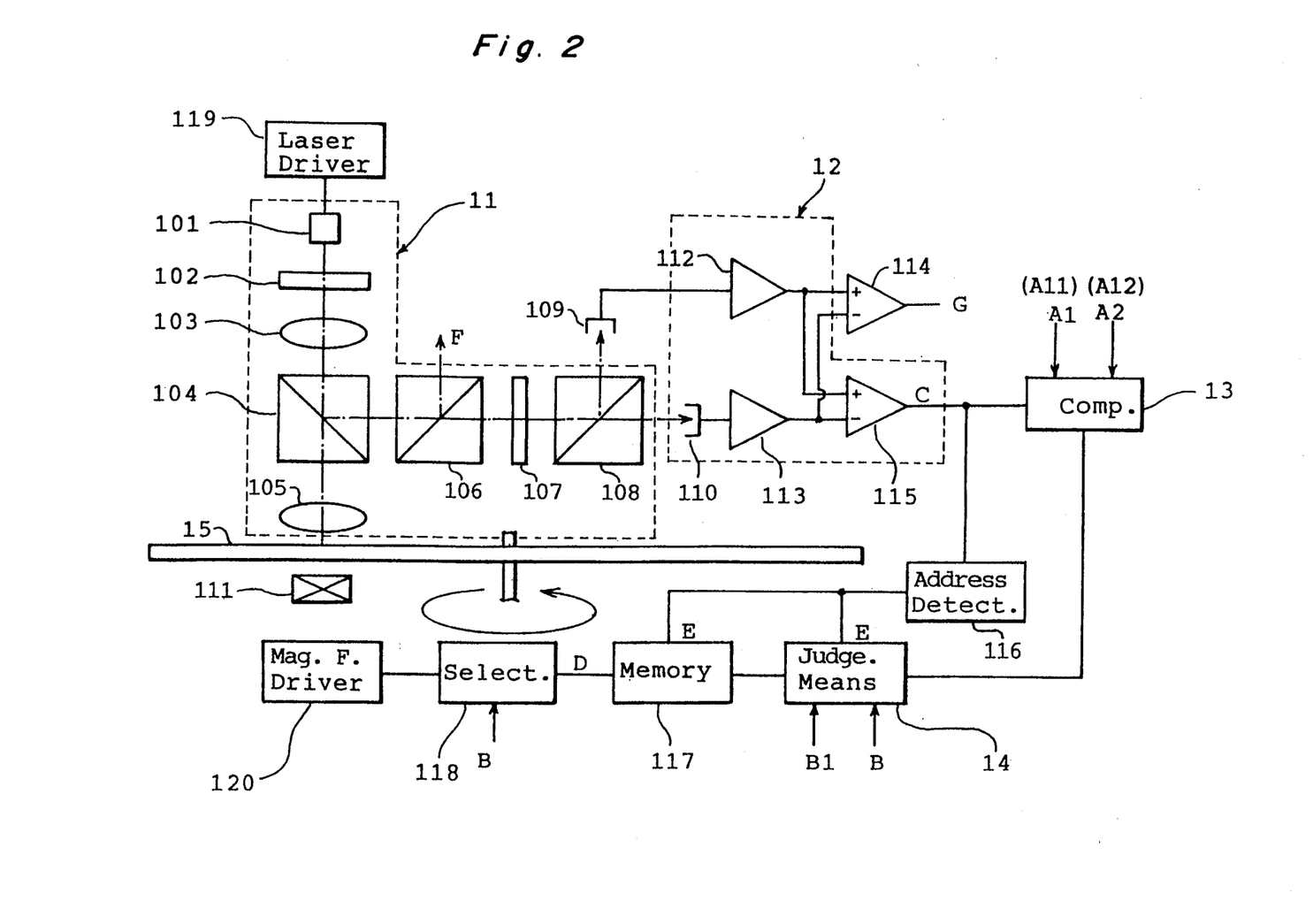
FIG. 2 is a block diagram of a magneto-optical recording and/or reading-out apparatus according to a first embodiment of the present invention.

Referring next to FIG. 2 showing a first preferred embodiment of the present invention, the optical head 11 includes a laser 101, a beam shaper 102, a collimator lens 103, a first beam splitter 104, an objective lens 105 positioned on one side of the magneto-optical disc 15 so as to irradiate a laser beam onto one of opposite surfaces, for example an upper surface, of the magneto-optical disc 15, a second beam splitter 106, a half-wave plate 107, and a polarizing beam splitter 108. The reflected beam detector 12 includes a first photoelectric converter 109, a second photoelectric converter 110, first and second preamplifiers 112 and 113, and a sum amplifier 115. The magneto-optical recording and/or reading-out apparatus of FIG. 2 further comprises a field modulating magnetic head 111 positioned on the other side of the magneto-optical disc 15 so as to confront the other of the opposite surfaces, that is, a lower surface, of the magneto-optical disc 15, a differential amplifier 114, an address detector 116, a memory 117, a recording signal selector 118, a laser driver 119, and a magnetic field modulation driver 120 electrically coupled with the magnetic head 111.

In FIG. 2, reference characters A1 and A2 represent lower and upper slice level signals, respectively; reference character B represents a write data signal indicative of data being recorded; reference character B1 represents a clock signal; reference character C represents a sum output signal; reference character D represents an address signal indicative of the address of a bad sector; reference character E represents an address signal; reference character F represents a light beam for use in accomplishing a tracking and a focusing (this light beam is hereinafter referred to as a servo light beam); and reference character G represents a read-out data signal indicative of data read out from the magneto-optical disc 15.

The magneto-optical recording and/or readinging-out apparatus having the above-described construction operates as follows.

The laser 101 provides a high-level continuous laser beam during an over-write recording mode, but a low-level continuous laser beam during a readout mode. Rays of light emitted from the laser 101 are bundled in a generally oval shape and are shaped by the beam shaper 102 into a generally round pencil of light which is subsequently converged on a recording film on the upper surface of the magneto-optical disc 15 through the collimator lens 103, the first beam splitter 104 and then through the objective lens 105. A portion of the recording film on the magneto-optical disc 15 where the laser beam is irradiated through the objective lens 105 has a magnetic field developed by the magnetic field modulation driver 120 through the magnetic head 111, which field is modulated either to a north pole or to a south pole according to a signal to be recorded.

It is to be noted that, for the magneto-optical disc 15 referred to in the present invention, a commercially available 3.5-inch magneto-optical disc formatted according to ISO standards is employed and is, during any of the recording, readout and erasing operation of the magneto-optical recording and/or reading-out apparatus, adapted to be driven at 2,400 rpm about its center.

A laser beam reflected from the magneto-optical disc 15 is separated by the first beam splitter 104 from the laser beam travelling therethrough towards the magneto-optical disc 15, and is then split by the second beam splitter 106 into the servo light beam F and another beam component which travels towards the polarizing beam splitter 108 through the half-wave plate 107. The laser beam incident on the polarizing beam splitter 108 is split into two polarized beam components travelling perpendicular to each other. These polarized beam components emerging from the polarizing beam splitter 108 are converted by the first and second photoelectric converters 109 and 110 into respective electric signals.

These electric signals outputted from the associated photoelectric converters 109 and 110 are, after having been amplified by the associated first and second preamplifiers 112 and 113, supplied to the differential amplifier 114 from which the readout data signal G is outputted. On the other hand, the amplified electric signals from the associated preamplifiers 112 and 113 are also supplied to the sum amplifier 115 from which the sum output signal proportional to the amount of light reflected such as, for example, a signal from pits formed on the surface of the magneto-optical disc 15 is outputted. The sum output signal emerging from the sum amplifier 115 is then supplied to the address detector 116 by which an address is detected.

The circuitry so far described above and its function are similar to the conventional magneto-optical recording and/or reading-out apparatus and are therefore well known.

Figure 6A:
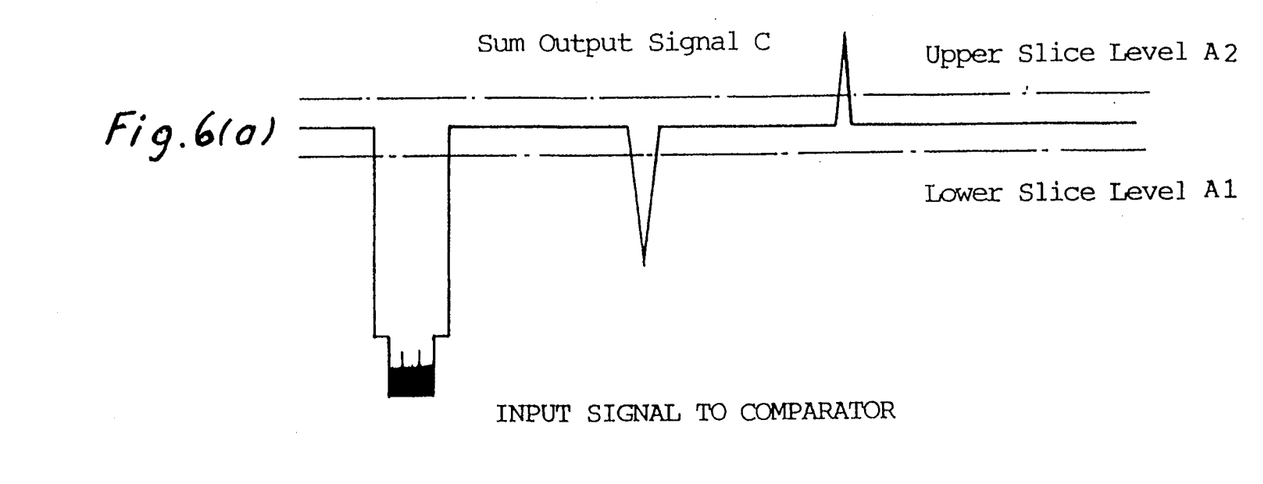
FIG. 6A–6B are charts showing waveforms of an input signal and an output signal to and from a comparator employed in the practice of the present invention.
Figure 6B:
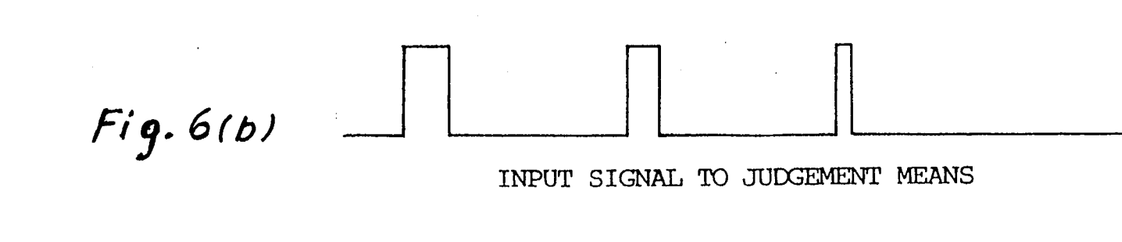

The sum output signal from the sum amplifier 115 is supplied not only to the address detector 116 as described above, but also to the comparator 13 to which are also inputted a lower slice level signal A1 and an upper slice level signal A2. As shown in FIG. 6(a), the lower slice level signal A1 is representative of a slice level somewhat lower than the level of the sum amplifier 115 obtainable from a data recording area during recording, whereas the upper slice level signal A2 is representative of a slice level somewhat higher than the level of the sum amplifier 115 obtainable from the data recording area during the recording. The comparator 13 compares the sum output signal from the sum amplifier 115 with the upper and lower slice level signals A2 and A1 so that a defect on the magneto-optical disc 15 by which the reflectance decreases and/or a defect on the magneto-optical disc 15 by which the reflectance increases can be recognized. The comparator 13 provides an output signal of a waveform as shown in FIG. 6(b).

The output signal from the comparator 13 is supplied to the judgement means 14 together with an output from the address detector 116, the data signal B being recorded, and the clock signal B1. The judgment means 14 has a first judging function to determine the magnitude of badness of the address in dependence on the output from the address detector 116 and a second judging function to determine the magnitude of badness of the data area in dependence on the output from the comparator 13, the clock signal B1, and the data signal B. Hence, the judgment means 14 determines the adequacy of the address by over-writing simultaneously with the readout of the address, and also determines the adequacy of the data area.

In the practice of the present invention, the following criterions are employed for the determination of the presence of a bad sector. So far as the address area is concerned:

(1) Sector mark is not detectable.

(2) Of the three address marks or addresses for each sector, an error is present at two or more address marks or addresses. So far as the data area is concerned:

(3) Within an area in which 3-byte sync data are recorded, a detect is found of a length in excess of one byte.

(4) Within 39 1-byte resync areas, a defect is found at two or more areas.

(5) Within the data area of each sector, a defect of a size corresponding to a 6-byte capacity in total is found.

In particular, so far as the criterions (3) to (5) are concerned, referencing to the signal to be recorded makes it possible to clarify what size of defect is present at what position in the sync data, the resync data and information data.

In this way, the judgment means 14 is effective to determine the acceptability of the sector while the over-writing is performed. The address number of the sector which is determined bad is stored in the memory 117 together with data intended to be recorded at such address number.

After the over-writing operation having taken place fin this manner, the data which should have been recorded in the sector then determined as a bad sector are collectively over-written. The recording signal selector 118 is employed for selecting one of information concerning the bad sector and the data signal as a signal to be recorded on the magneto-optical disc 15.

According to the foregoing embodiment of the present invention, a result of experiments in which 10 magneto-optical discs were recorded and read out has indicated that 121 bad sectors found in total in the 10 discs could be determined bad at the time of the over-writing operation, with no need to perform verification subject to each of the magneto-optical discs.

As hereinbefore described, the employment of the judgement means and the comparator coupled with the reflected beam detector makes it possible to determine acceptability of sectors at the time the over-writing is performed with the continuous laser beam of a predetermined intensity while the magnetic field on the magneto-optical disc is modulated, with no need to perform the verification. Consequently, in contrast to the prior art which requires two steps of over-writing and verifying during recording, the present invention requires only one step of over-writing to be performed to give rise to effects similar to those afforded by the prior art with no need to perform verification. This results in a reduction in time required to accomplish the recording, excluding an access time, to a value which is generally one half that required according to the prior art.

Hereinafter, the apparatus according to a second embodiment of the present invention will be discussed. The apparatus according to the second embodiment is substantially similar in structure to that shown in FIG. 2 except that, in the second embodiment, the upper slice level signal A2 discussed in connection with the foregoing embodiment is not employed. In other words, the apparatus according to the second embodiment is such that, while the over-writing is carried out with the magnetic field modulated, the acceptability of the address is checked in reference to the sum signal C simultaneously with the readout thereof and, at the same time, the acceptability of the data area is checked. In the practice of the second embodiment of the present invention, the same criterions for the determination of the acceptability as in the previously described embodiment were employed.

Under these conditions, by varying the level of the lower slice level signal A1, the recognizing ratio of bad sectors attributable to data areas in each of the 10 magneto-optic discs used in the previously described embodiment was examined.

Prior to the examination, the details of the 121 bad sectors found during the experiments conducted in connection with the previously described embodiment were examined. As a result thereof, it has been found that, of the 121 bad sectors, the 68 sectors were defective in sector marks or addresses and the remaining 53 sectors were defective in data areas.

Figure 3:
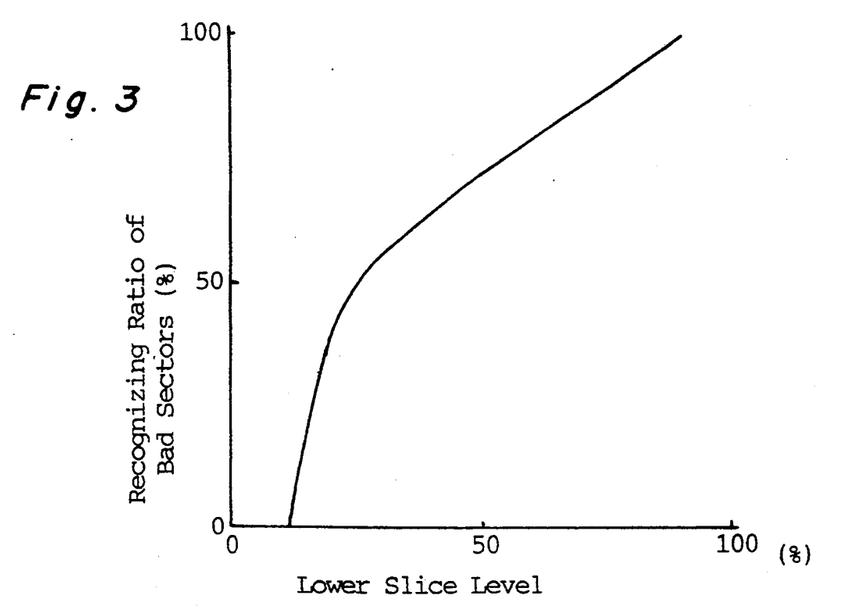
FIG. 3 is a graph showing the rate of bad sectors in a magneto-optical disc recognized in reference to one of decision criterions according to a second embodiment of the present invention.

In this embodiment, however, the recognizing ratio of the 53 bad sectors due to the defect in the data area was examined by varying the level of the lower slice level signal A1, a result of which is shown in FIG. 3. In the graph of FIG. 3, the ordinate axis represents the recognizing ratio of the bad sectors whereas the abscissa axis represents the level of the lower slice level signal A1 with respect to the average value per revolution of the sum signals picked up from the data areas excluding pit areas.

As can be understood from the graph of FIG. 3, when the level of the lower slice level signal A1 is chosen to be of a value greater than or equal to 90% of the average value of the sum signals from the data areas, all of the bad sectors can be recognized.

In the practice of the second embodiment of the present invention, the recognizing ratio of the bad sectors resulting from the defect in the data area was examined using the following criteria, which are easier than those employed in the practice of the first embodiment of the present invention, for the determination of the presence of the bad sector in the data area. So far as the address area is concerned:

(1) Within an area in which 3-byte sync data are recorded, a detect is found of a length in excess of 12 bits.

(2) Within 39 1-byte resync areas, a defect is found at two or more consecutive areas.

(3) Within the data area of each sector, a defect of a size corresponding to a 15-byte or more capacity in total is found.

Although the criterions used in the second embodiment are easier than those in the first embodiment, no practical problem occur since the resync which is dropped out is supplemented by a quasi-resync.

Of the 53 bad sectors in the data area found in the practice of the first embodiment, the number of sectors which have been determined as bad sectors according to the foregoing criterions was 17 sectors. The recognizing ratio of these 17 bad sectors resulting from the defect in the data area was examined by varying the level of the lower slice level signal A1, a result of which is shown in FIG. 4 wherein the ordinate axis represents the recognizing ratio of the bad sectors whereas the abscissa axis represents the level of the lower slice level signal A1 with respect to the average value per revolution of the sum signals picked up from the data areas excluding pit areas.

Figure 4:
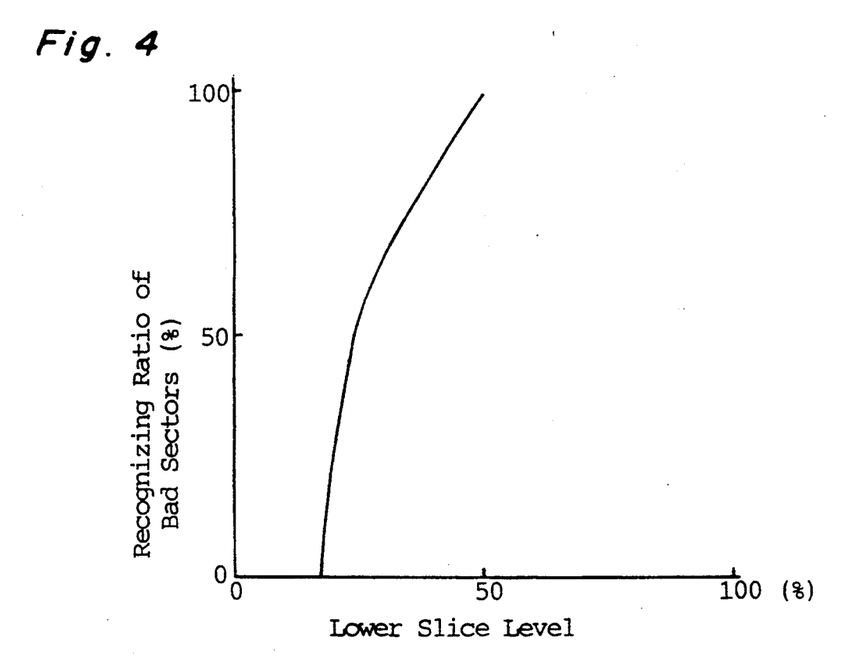
FIG. 4 is a graph showing the rate of bad sectors in a magneto-optical disc recognized in reference to another one of the decision criterions according to the second embodiment of the present invention.

As can be understood from the graph of FIG. 4, when the level of the lower slice level signal A1 is chosen to be of a value greater than or equal to 50% of the average value of the sum signals from the data areas, all of the bad sectors can be recognized.

Thus, a combination of the results shown respectively in FIGS. 3 and 4 makes the following clear:

(a) Although the upper slice level signal A2 shown in FIG. 2 is, if employed, effective to increase the accuracy in detection of the bad sectors, only the lower slice level signal A1 can effectively be employed for the detection of the bad sectors.

(b) In order to accomplish a strict management of the detects, the lower slice level signal A1 should be of a value greater than or equal to 90% of the average value of the sum signals from the data area.

(c) Even though the level of the lower slice level signal A1 is chosen to be of a value greater than or equal to 50% of the average value of the sum signals from the data area, the use thereof poses no practical problem.

In any event, it is preferable that the lower slice level signal A1 be of a value not greater than 95% of the average value of the sum signals from the data area to accommodate a change in reflectance during one revolution.

If the average value of the sum signals from the data area is calculated by the following learning method, the lower slice level signal A1 may be of a value not greater than 98% of the average value of the sum signals from the data area. Specifically, the average value of the sum signals from the data area may be calculated by sampling a plurality of sum signals from the data area for each revolution of the magneto-optical disc and then extracting some of them from the neighborhood of a portion of the magneto-optical disc to be over-written thereby to learn the average value of the sum signals. By way of example, in the magneto-optical disc containing 25 sectors per track, such as used in the practice of this embodiment, resyncs from the data area in each sector, that is, 39-point sum signals, are extracted and, based on these extracted signals, the level of the lower slice level signal A1 is varied for each sector. By this method, the lower slice level signal A1 can be set to a value not greater than 98% of the average value of the sum signals from a sector immediately preceding the sector to be over-written. This method is particularly effectively applied to the magneto-optical disc of a type in which, because the film has been deposited without rotating the disc, the reflectance is distributed in a direction circumferentially thereof.

Contrary to the foregoing, where no adjustment is effected of the level of the lower slice level signal A1 to accommodate a difference among the individual magneto-optical discs, the magneto-optical discs have a varying reflectance and, therefore, the level of the lower slice level signal A1 must be of a value not greater than 80% of the average value of the sum signals.

Summarizing the foregoing, the following requirements are essential in the practice of this embodiment of the present invention.

(d) Where the average value of the sum signals from the data area is determined individually with respect to the circumferential and radial directions of the magneto-optical disc, the lower slice level signal A1 must be of a value not greater than 98% of the average value of the sum signals from the data area.

(e) Where the average value of the sum signals from the data area is determined for each revolution of the magneto-optical disc, the level of the lower slice level signal A1 must be of a value not greater than 95% of the average value of the sum signals from the data area.

(f) Where the average value of the sum signals from the data area is determined straightforward, the level of the lower slice level signal A1 must be of a value not greater than 80% of the average value of the sum signals from the data area.

Hereinafter, a third preferred embodiment of the present invention will be described. The apparatus employed in the practice of the third embodiment of the present invention is of a construction substantially similar to that in the first embodiment except that the upper slice level signal A2 discussed in connection with the first embodiment is not employed and first and second lower slice level signals A11 and A12 are employed. In other words, the apparatus according to the third embodiment is such that, while the over-writing is carried out with the magnetic field modulated, the acceptability of the address is checked in reference to the sum signal C simultaneously with the readout thereof and, at the same time, the acceptability of the data area is checked. In the practice of the third embodiment of the present invention, the same criterions for the determination of the acceptability as in the previously described first embodiment were employed. Also, the level of the first lower slice level signal A11 was chosen to be of a value equal to 90% of the average value of the sum signals whereas that of the second lower slice level signal A12 was chosen to be of a value equal to 50% of the average value of the sum signals.

Under these conditions, the bad sectors attributable to the data area in the 10 magneto-optical discs (having 2,500,000 sectors in total) used in the practice of the first embodiment of the present invention were examined. As a result thereof, the number of sectors which were recognized as bad sectors at the level of the second lower slice level signal A12 was 39 sectors, all of which were those which had been recognized as bad sectors in the first embodiment of the present invention.

The number of the bad sectors recognized at the level of the first lower slice level signal A11 was 12,116 sectors and, of these bad sectors, the 53 bad sectors recognized in the practice of the first embodiment of the present invention were included. This is an example of recognition of the bad sectors. Thus, if the lower slice level signal A1 is chosen to be a lower value, the bad sectors detected are really unfavorable, but all of bad sectors that are practically unfavorable cannot be detected. If the lower slice level signal A1 is chosen to be of a higher value, all of the bad sectors that are practically unfavorable can be detected, but some of the sectors which can be practically usable may be detected as bad sectors.

In view of the above, the following functions are added to the judgement means 14.

(A) To determine, as bad sectors, all of the bad sectors recognized at the level of the second lower slice level signal A12.

(B) To determine, as doubtful sectors, those of the sectors which have been determined as bad sectors at the level of the first lower slice level signal A11, but which have not been determined as bad sectors at the level of the second lower slice level signal A12, and to verify such doubtful sectors.

(C) To omit the verification while all of the sectors which have not been determined as bad sectors at the level of the first lower slice level signal A11 are recognized as good sectors.

Using the judgement means 14 having these functions, an over-write recording was performed on each of the 10 magneto-optical discs used in the practice of the first embodiment. As a result thereof, it has been found that, out of the 2,500,000 sectors, only 12,077 sectors were verified which corresponds to 0.5% or smaller than the total number of all the sectors. Thus, the length of time required to accomplish the verification according this method is increased merely by 0.5% and, in addition, only the sectors which are not practically usable can be extracted.

Accordingly, according to the third embodiment of the present invention, even with the method of verifying only the doubtful sectors which are problematic as to the availability thereof in practical use, a similar advantage can be obtained in which the length of time required to accomplish the recording, excluding the access time, can be reduced to about ½.

When all of the sectors determined as bad sectors at the level of the first lower slice level signal A11 were verified with no second lower slice level signal A12 used, only 12,116 sectors out of the 2,500,000 sectors were verified which corresponds to 0.5% or less of the total sectors. In the first embodiment, although all the sectors are to be classified into either good sectors or bad sectors, it is effective to verify only the sectors which have been determined as bad sectors.

A fourth preferred embodiment of the present invention will now be described with reference to FIG. 5 which illustrates a magneto-optical recording and/or reading-out apparatus according to this embodiment.

Figure 5:
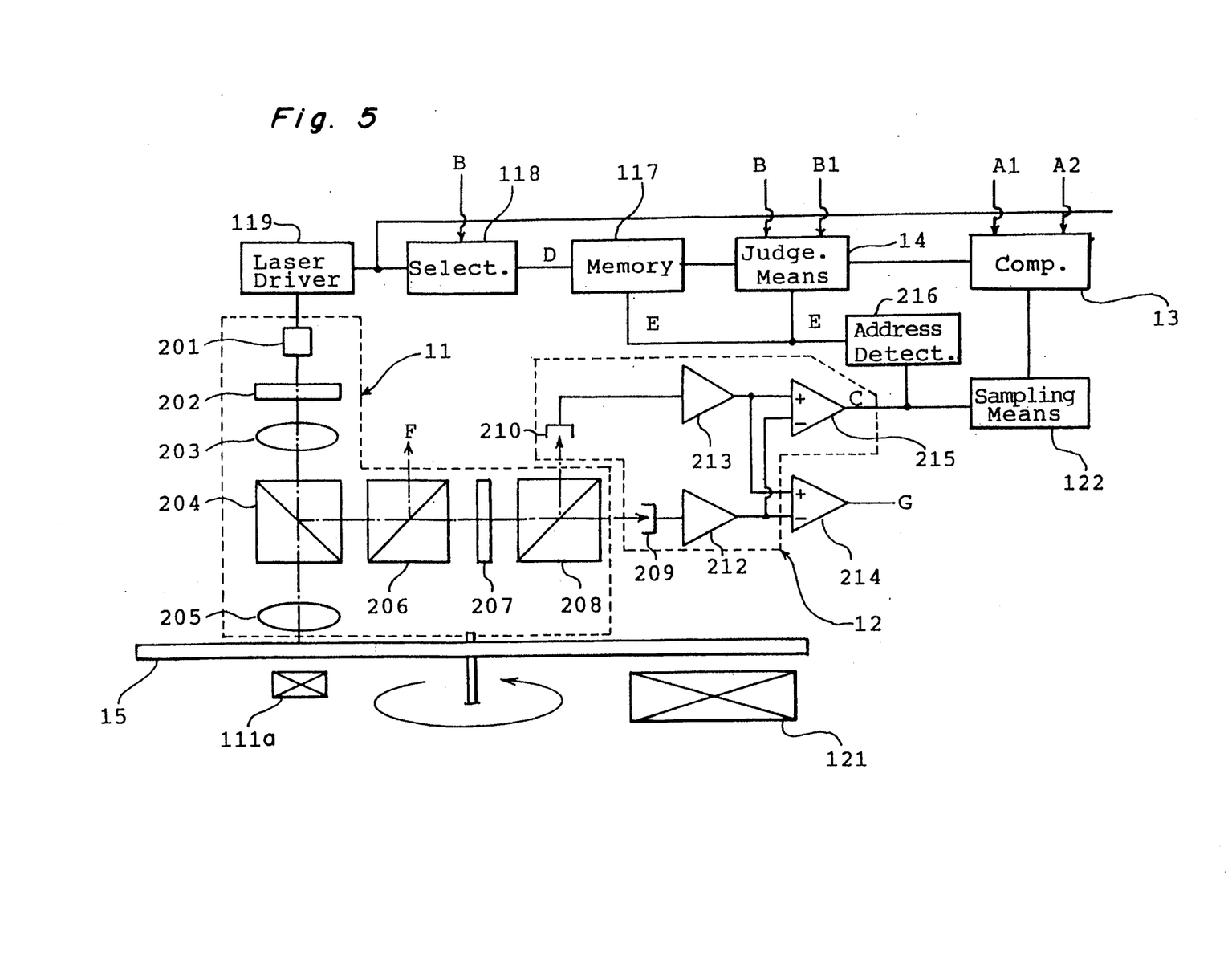
FIG. 5 is a diagram similar to FIG. 2, but showing the apparatus according to a fourth embodiment of the present invention.

The magneto-optical recording and/or reading-out apparatus shown in FIG. 5 generally comprises an optical head 11, a reflected beam detector 12 for detecting a reflected beam during recording, a comparator 13, and a judgment means 14. The optical head 11 includes a laser 101, a beam shaper 102, a collimator lens 103, a first beam splitter 104, an objective lens 105 positioned on one side of a magneto-optical disc 15 so as to irradiate a laser beam onto one of opposite surfaces, for example an upper surface, of the magneto-optical disc 15, a second beam splitter 106, a half-wave plate 107, and a polarizing beam splitter 108. The reflected beam detector 12 includes a first photoelectric converter 109, a second photoelectric converter 110, first and second preamplifiers 112 and 113, and a sum amplifier 115. The magneto-optical recording and/or reading-out apparatus of FIG. 5 further comprises a biasing magnetic head 111a positioned on the other side of the magneto-optical disc 15 so as to confront the other of the opposite surfaces, that is, a lower surface, of the magneto-optical disc 15, a differential amplifier 114, an address detector 116, a memory 117, a recording signal selector 118, a laser driver 119, an initializing magnetic head 121, and a sampling means 122.

In FIG. 5, reference characters A1 and A2 represent lower and upper slice level signals, respectively; reference character B represents a write data signal indicative of data being recorded; reference character B1 represents a clock signal; reference character C represents a sum output signal; reference character D represents an address signal indicative of the address of a bad sector; reference character E represents an address signal; reference character F represents a servo light beam; and reference character G represents a read-out data signal indicative of data read out from the magneto-optical disc 15.

The magneto-optical recording and/or reading-out apparatus according to the fourth embodiment of the present invention operates as follows.

The laser 101 provides a laser beam, modulated high or low according to data to be recorded, during an over-write recording mode, but a continuous laser beam lower in level than the above described level beam during a readout mode. Rays of light emitted from the laser 101 are bundled in a generally oval shape and are shaped by the beam shaper 102 into a generally round pencil of light. This light is subsequently converged on a recording film on the upper surface of the magneto-optical disc 15 through the collimator lens 103, the first beam splitter 104 and then through the objective lens 105. A portion of the recording film on the magneto-optical disc 15 where the laser beam is irradiated through the objective lens 105 has a predetermined magnetic field of 300 oe developed by the biasing magnetic head 111a. Another portion of the recording film on the magneto-optical disc 15 has a predetermined magnetic field of 3 Koe, opposite in polarity to that at said portion, developed by the initializing magnetic head 121. It is to be noted that, for the magneto-optical disc 15 referred to in the present invention, a commercially available 3.5-inch magneto-optical disc formatted according to ISO standards is employed. During any of the recording, readout and erasing operation of the magneto-optical recording and/or reading-out apparatus, the magneto-optical disc is driven at 2,400 rpm about its center.

A laser beam reflected from the magneto-optical disc 15 is separated by the first beam splitter 104 from the laser beam travelling therethrough towards the magneto-optical disc 15. The separated laser beam is then split by the second beam splitter 106 into the servo light beam F and another beam component which travels towards the polarizing beam splitter 108 through the half-wave plate 107. The laser beam incident on the polarizing beam splitter 108 is split into two polarized beam components travelling perpendicular to each other. These polarized beam components emerging from the polarizing beam splitter 108 are converted by the first and second photoelectric converters 109 and 110 into respective electric signals.

These electric signals outputted from the associated photoelectric converters 109 and 110 are, after having been amplified by the associated first and second preamplifiers 112 and 113, supplied to the differential amplifier 114 from which the readout data signal G is outputted. On the other hand, the amplified electric signals from the associated preamplifiers 112 and 113 are also supplied to the sum amplifier 115 from which the sum output signal proportional to the amount of light reflected such as, for example, a signal from pits formed on the surface of the magneto-optical disc 15 is outputted. The sum output signal emerging from the sum amplifier 115 is then supplied to the address detector 116 by which an address is detected.

The circuitry so far described above and its function are similar to the conventional magneto-optical recording and/or reading-out apparatus and are therefore well known.

The sum output signal from the sum amplifier 115 is supplied not only to the address detector 116, but also to the sampling means 122. The sampling means 122 can sample either the timing of a high-power radiation or that of a low-power radiation during the light modulated over-writing. In this embodiment, only the timing of the low-power radiation during the light modulated over-writing is sampled. An output emerging from the sampling means 122 is then supplied to the comparator 13 to which are also inputted the lower slice level signal A1 and the upper slice level signal A2. As shown in FIG. 6(a), the lower slice level signal A1 is representative of a slice level somewhat lower than the level of the sum amplifier 115 obtainable from a data recording area during overwriting, whereas the upper slice level signal A2 is representative of a slice level somewhat higher than the level of the sum amplifier 115 obtainable from the data recording area during the overwriting. This comparator 13 compares the sum output signal from the sum amplifier 115 with the upper and lower slice level signals A2 and A1 so that a defect on the magneto-optical disc 15 by which the reflectance increases and/or a defect on the magneto-optical disc 15 by which the reflectance increases can be recognized. The comparator 13 provides an output signal having a waveform as shown in FIG. 6(b).

The output signal from the comparator 13 is supplied to the judgement means 14 together with an output from the address detector 116, data B being recorded, and the clock signal B1. The judgment means 14 has a first judging function to determine the magnitude of badness of the address in dependence on the output from the address detector 116 and a second judging function to determine the magnitude of badness of the data area in dependence on the output from the comparator 13, the data B being recorded, and the clock signal B1. Hence, the judgment means 14 determines the adequacy of the address by over-writing simultaneously with the readout of the address, and also determines the adequacy of the data area. In the practice of the fourth embodiment of the present invention, the same criterions as employed in the practice of the first embodiment were employed for the determination of the presence of a bad sector.

In this way, it is possible to determine the presence or absence of bad sectors while the over-writing is performed. The address number of the sector which is determined bad is stored in the memory 117 together with data intended to be recorded at such address number.

After the over-writing operation having taken place in this manner, the data which should have been recorded in the sector then determined as a bad sector are collectively over-written. The recording signal selector 118 is employed for selecting one of information concerning the bad sector and the data signal as a signal to be recorded on the magneto-optical disc 15.

When 10 magneto-optical discs were recorded and read out over the entire surfaces thereof in a manner similar the first embodiment of the present invention, all of the 121 bad sectors found were determined defective with no need to perform a further verification.

As hereinbefore described, the employment of the sampling means coupled with the sum amplifier, the comparator and the judgement means makes it possible to determine the acceptability of the sector at the time the over-writing is performed with the continuous laser beam of a predetermined intensity while the magnetic field on the magneto-optical disc is modulated, with no need to perform the verification. Consequently, in contrast to the prior art which requires two steps of over-writing and verifying during the recording, the present invention requires only one step of over-writing to be performed to give rise to effects similar to those afforded by the prior art. This results in a reduction in time required to accomplish the recording, excluding an access time, to a value which is generally one half that required according to the prior art.

It is to be noted that, in the third embodiment of the present invention, although the output emerging from the sum amplifier at the time of the low-power radiation of the modulated light has been sampled, similar effects can be obtained even if the output emerging from the sum amplifier at the time of the high-power radiation is sampled.

It is also to be noted that, although in the third embodiment of the present invention reference has been made to the light modulated over-writing process, similar effects can also be obtained even during a recording of the standard disc.

A fifth embodiment of the present invention will now be discussed. In the practice of the fifth embodiment of the present invention, the use has been made of the apparatus of a construction shown in and described with reference to FIG. 2. In the same manner as described in connection with the first embodiment as far as the determination of the acceptability of the sectors, the acceptability of the sectors is determined while the over-writing is performed. However, a sequencing system is employed in which, in the event that during the over-writing the sectors have been found not usable, data to be recorded in some of the sectors which are determined as bad sectors are recorded in the next succeeding sectors. At this time, the address numbers of the sectors determined bad are sequentially stored in the memory 117.

In this manner, after the over-writing, the address numbers of the bad sectors are recorded on respective control areas formed in the radially innermost and outermost areas of the disc.

When the same 10 magneto-optical discs used in the practice of the first embodiment were recorded and read out over the entire surfaces thereof, it has been found that all of the bad sectors which amounted to 121 in total were determined defective during the over-writing, and the address numbers of those bad sectors could be recorded on the respective control areas formed in the radially innermost and outermost areas of each disc.

As hereinabove described, the fifth embodiment of the present invention can be effectively applied to the method wherein the data to be recorded in the bad sectors are recorded again on the next succeeding sectors with only the address numbers of the bad sectors recorded on the control areas. Even in the practice of this method, the use of the comparator coupled with the sum amplifier and the judgement means in a manner similar to that in the first embodiment makes it possible to determine the acceptability of the sector at the time the over-writing is performed, with no need to perform the verification. Consequently, in contrast to the prior art which requires two steps of over-writing and verifying during the recording, the present invention requires only one step of over-writing to be performed to give rise to effects similar to those afforded by the prior art with no need to perform the verification. This results in a reduction in time required to accomplish the recording, excluding an access time, to a value which is generally one half that required according to the prior art.

A sixth embodiment of the present invention will now be described. The apparatus used in the practice of this embodiment is similar to that used in the practice of the first embodiment except that the use of the memory 117 shogun in FIG. 2 is dispensed with. The process from the start to the time at which the acceptability of the sectors is determined while the over-writing is performed is substantially identical with that employed in the practice of the first embodiment. However, according to the sixth embodiment of the present invention, a sequencing system is employed wherein, in the event that some of the sectors are determined as bad sectors during the execution of the over-writing, identifier signals are recorded at respective tail ends of the bad sectors while data which ought to have been recorded in the bad sectors are recorded in the next succeeding sectors. At this time, unlike the first and second embodiments of the present invention, the address number of the respective sectors which have been determined as bad sectors and the associated data are not stored in the memory 117.

When 10 magneto-optical discs were recorded and read out over the entire surfaces thereof, all of the 121 bad sectors found were determined defective during the overwriting operation. Also, the identifier signals descriptive of the bad sectors were recorded at the respective tail ends of all the bad sectors.

In the event that during the readout the identifier signal descriptive of the bad sector is detected, the use of a method wherein only data read out from such bad sector are cleared and data are read out from the next succeeding sector permits a readout of the recorded data as if there were no bad sector.

As hereinbefore described, the sixth embodiment of the present invention is effectively applicable also to the method wherein an identifier signal descriptive of a bad sector is recorded at a tail end of such bad sector and data which ought to have been recorded on the bad sector are recorded on the next succeeding sector. Even in this method, the employment of the comparator, coupled with the sum amplifier, and the judgement means, as is the case with that in the first embodiment of the present invention, makes it possible to determine the acceptability of the sector at the time the over-writing is performed with the continuous laser beam of a predetermined intensity while the magnetic field on the magneto-optical disc is modulated, with no need to perform the verification. Consequently, in contrast to the prior art which requires two steps of over-writing and verifying during the recording, the present invention requires only one step of over-writing to be performed to give rise to effects similar to those afforded by the prior art. This results in a reduction in time required to accomplish the recording, excluding an access time, to a value which is generally one half that required according to the prior art.

In the meantime, if the criterions for the determination of bad sectors are strictly formulated, a substantial number of sectors including not only normal sectors, which can be practically usable, but also sectors which may pose a problem during use may be counted as bad sectors. However according to the third embodiment of the present invention, of the 12,116 sectors in total which have been determined as bad sectors, only the 53 sectors have been proven that they might pose a problem during use, and indeed, the sectors in a number 200 times or more of the practically problematic sectors have been determined defective.

If it is desired that all of those sectors are treated as bad sectors and the data which ought to have been recorded therein are recorded in predetermined alternative sectors, such alternative sectors must be prepared beforehand. The 12,116 sectors deemed to be bad are included in the 10 magneto-optical discs and it may be that an average of about 1,200 bad sectors is included in each magneto-optical disc. The alternative sectors for recording therein the data which ought to have been recorded on the sectors eventually deemed to be bad should be secured in consideration of a variation in magneto-optical discs. Accordingly, the number of the alternative sectors should be within the range of 5 to 10% of the total number of the sectors in each magneto-optical disc.

However, according to any one of the fifth and sixth embodiments of the present invention, the alternative sectors need not be secured and, even though all of the 12,116 sectors are determined as the bad sectors, the capacity of the magneto-optical disc is reduced by an amount corresponding to that occupied by the 12,116 bad sectors which may be about 0.5% or less on an average. A loss of 0.5% or less in capacity of the magneto-optical disc is believed to have no practical problem. In other words, apart from the problem associated with the strict criterions used to determine if the magneto-optical disc may not be used in practice, any one of the fifth and sixth embodiment of the present invention provides an effective and excellent means for dealing with the doubtful sectors, which may not be practically usable, as the bad sectors without verifying them.

It is to be noted that, in the description of any one of the foregoing embodiments of the present invention, reference has been made to the use of the conventionally employed typical optical system. However, the essence of the present invention lies in that the presence or absence of a defect in a magneto-optical disc is recognized in reference to a change in amount of light reflected from the magneto-optical disc during the recording, followed by the determination of whether or not the defect recognized is detrimental in reference to the signal to be recorded. Accordingly, the present invention is applicable to any magneto-optical recording and/or reading-out head, provided that the latter can detect a change in amount of light. Specifically, if a sufficient band region is secured electrically, it is possible to determine the presence or absence of the defect by means of a servo signal.

As regards a defect in the address, since the acceptability thereof is determined by reading the address, the use of the constant continuous light suffices during the reading of the address, which may be of a type having either the high level power, such as employed during the overwriting or erasure, or the low level power such as used during the readout.

Also, in any one of the foregoing embodiments of the present invention, the use has been referred to of the 3.5-inch (90 mm) magneto-optical discs of ISO standard format. However, the determination of the presence or absence of the defect in reference to the change in amount of light reflected during the overwriting can effectively be applicable equally to any optical disc having hard or soft sectors, that having a continuous groove or a sample format, or that of a CLV (Constant Linear Velocity) or CAV (Constant Angular Velocity) type.

Yet, the criterions for the determination of the bad sectors may not be always limited to those set forth herein. Instead thereof, any criterions by which any sector containing a defect of 3 bytes or more per interleave can be determined as a bad sector can be employed in the practice of the present invention.

Furthermore, in any one of the foregoing embodiments of the present invention, reference has been made to the determination of the bad sector in reference to the address signal and the change in amount of light reflected from the disc. However, the determination may be accomplished with the use of not only the address signal and the change in amount of the reflected light, but also an abnormality in an error signal such as occurring in a focusing servo system and a tracking servo system.

Figure 7:
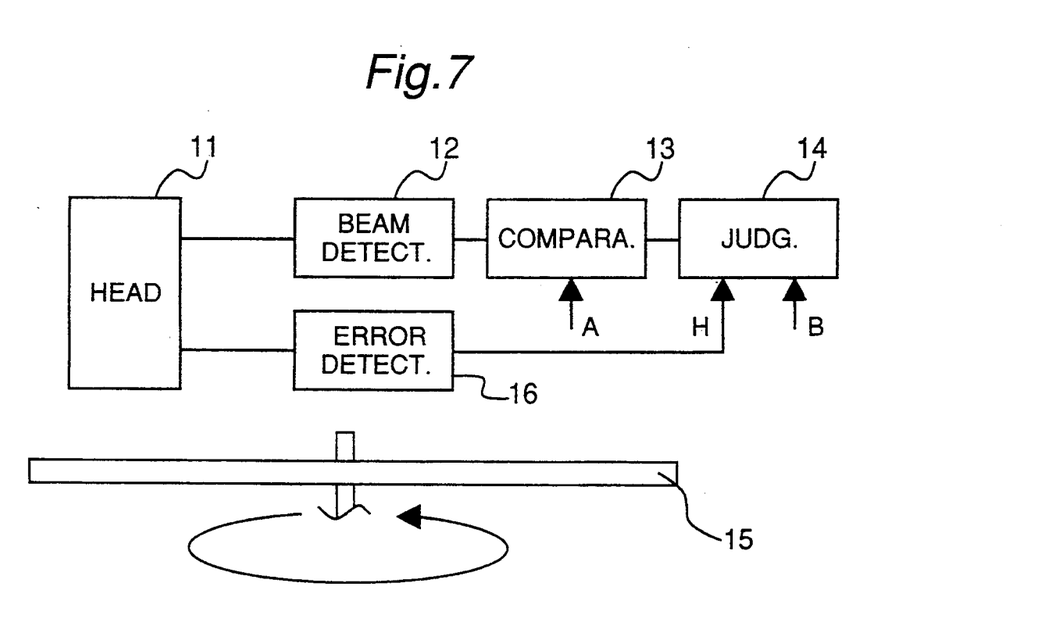
FIG. 7 is a diagram similar to FIG. 1, but showing a modification of the magneto-optical recording and/or reading-out apparatus of FIG. 1.

FIG. 7 schematically depicts a modification of the magneto-optical recording and/or reading-out apparatus shown in FIG. 1. The magneto-optical recording and/or reading-out apparatus of FIG. 7 is additionally provided with an error detector 16 for detecting an abnormality in an error signal by comparing each of servo signals with a reference signal. Such servo signals include focusing error signals and tracking error signals. By the provision of the error detector 16, all regions which have been recognized as being abnormal were determined as bad regions. When the over-writing operation was performed with respect to a disc containing some bad sectors resulting from the presence of defects of a size greater than or equal to 80 μm on one of the surfaces of the disc onto which the light is irradiated, these defects could be recognized as the bad sectors containing an abnormality in the servo error signal, though they could not be detected as containing an abnormality in reflected light.

Moreover, although in any one of the foregoing embodiments of the present invention, the determination of the presence or absence of the bad sector has been carried out by using the address signal and the change in amount of light reflected, it is possible to determine the presence or absence of the bad sectors with the use of information indicative of an abnormality in output from the laser which is detected by a laser output monitor.

As hereinbefore described, the employment of the comparator and the judgement means, coupled with the sum amplifier following the optical system, makes it possible to determine the acceptability of the sector during the recording with no need to perform the verification or with the verification performed only in seldom cases. Consequently, in contrast to the prior art which requires two steps of over-writing and verifying during the recording, the present invention requires only one step of over-writing to be performed to give rise to effects similar to those afforded by the prior art with no need to perform verification. This results in a reduction in time required to accomplish the recording, excluding an access time, to a value which is generally one half that required according to the prior art.

Also, the recording of data in the alternative sectors chosen in place of the bad sectors need not be performed so frequently and can be accomplished after the recording and, therefore, no substantial time may be spent in an access to the alternative sectors. The present invention has an additional advantage in that, not only can the time required to accomplish the recording be reduced, but the bad sector can also be managed with no loss in time. Accordingly, there is no need to check the presence or absence of bad sectors while spending a substantial amount of time before the actual use of the disc.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A magneto-optical recording and/or reading-out apparatus capable of recording and reading out information on and from a magneto-optical recording medium by use of a laser beam, said apparatus comprising:
   a reflected beam detector for detecting the intensity of a laser beam reflected from said magneto-optical recording medium during recording;
   a comparator, operatively coupled with said reflected beam detector, for comparing the intensity of said reflected laser beam with at least one reference value during the recording, thereby detecting an abnormality in said reflected laser beam, said abnormality indicating the existence of a defect in said magneto-optical recording medium; and
   a judgment means, operatively coupled with said comparator, for judging whether a first area of said magneto-optical recording medium which has caused said abnormality is practically usable, in accordance with an output from said comparator and data to be recorded on said first area.

2. The apparatus according to claim 1, wherein said judgment means judges whether said first area is a good area which can be safely used with a recording operation being performed thereto or a doubtful area which is problematic as to an availability thereof in practical use.

3. The apparatus according to claim 2, wherein when said judgment means judges that said first area is said doubtful area during the recording, said first area is regarded as a bad area which cannot be used.

4. The apparatus according to claim 3, wherein when said first area is recognized as said doubtful area during the recording, data to be recorded on said first area is recorded on a next succeeding area.

5. The apparatus according to claim 2, wherein said first area is recognized as said doubtful area during the recording, only said first area is selectively verified.

6. The apparatus according to claim 5, further comprising a memory means for temporarily storing, when said doubtful area is recognized as said bad area as a result of a verification, recording data and address information to be recorded on said bad area, wherein said recording data and address information are re-recorded on an alternative area prepared in advance.

7. The apparatus according to claim 2, wherein said reference value is chosen to be of a value in dependence on an average intensity of a laser beam reflected from data areas excluding pit areas.

8. The apparatus according to claim 7, wherein said reference value ranges from 50% to 95% relative to said average intensity of said reflected laser beam.

9. The apparatus according to claim 2, wherein an intensity of said reflected laser beam from data areas excluding pit areas is sampled, wherein an average intensity of said reflected laser beam from the neighborhood of a data area on which a recording operation is being performed is calculated, and wherein said reference value is calculated in dependence on said average intensity of said reflected laser beam.

10. The apparatus according to claim 9, wherein said reference value ranges from 50% to 98% relative to said average intensity of said reflected laser beam.

11. The apparatus according to claim 1, further comprising an error detector for detecting an abnormality in at least one of tracking and focusing servo signals during recording, wherein said judgment means judges whether a second are of said magneto-optical recording medium which has caused said abnormality in said servo signals is practically usable.

12. A magneto-optical recording and/or reading-out apparatus capable of recording and reading out information on and from a magneto-optical recording medium by use of a laser beam, said apparatus comprising:
a reflected beam detector for detecting the intensity of a laser beam reflected from said magneto-optical recording medium during recording;
a comparator, operatively coupled with said reflected beam detector, for comparing the intensity of said reflected laser beam with two reference values during the recording, thereby detecting an abnormality in said reflected laser beam, said abnormality indicating the existence of a defect in said magneto-optical recording medium; and
a judgment means, operatively coupled with said comparator, for judging, in reference to a first area detected upon comparison with a first reference value and first data to be recorded on said first area, whether said first area is at least one of a good area which can be safely used and a doubtful area which is problematic as to an availability thereof in practical use, said judgment means further judging, in reference to a second area detected upon comparison with a second reference value and second data to be recorded on said second area, whether said second area is at least one of said doubtful area and a bad area which cannot be used, so that said judgment means judges each of said first and second areas as any one of said good area, said doubtful area, and said bad area.

13. The apparatus according to claim 12, wherein when said judgment means judges that each of said first and second areas is said doubtful area during the recording, only said doubtful area is selectively verified.

14. The apparatus according to claim 13, further comprising a memory means for temporarily storing, when said doubtful area is recognized as said bad area as a result of a verification, recording data and address information to be recorded on said bad area, wherein said recording data and address information are re-recorded on an alternative area prepared in advance.

15. The apparatus according to claim 13, wherein said first reference value is greater than 90% relative to said average intensity of said reflected laser beam whereas said second reference value is less than 50% relative to said average intensity of said reflected laser beam.

16. A magneto-optical recording and/or reading-out apparatus capable of recording information on a magneto-optical recording medium by use of a continuous laser beam having a predetermined intensity, said apparatus comprising:
an address detector for detecting an address;
a reflected beam detector, operatively coupled with said address detector, for detecting a change in intensity of a laser beam reflected from said magneto-optical recording medium;
a comparator, operatively coupled with said reflected beam detector, for comparing an output level of said reflected beam detector with at least one reference value; and
a judgment means, operatively coupled with said comparator, for judging whether an area of said magneto-optical recording medium which has caused an abnormality in output level of said comparator is practically usable, in reference to data to be recorded on said area, said abnormality indicating the existence of a defect in said area.

17. A magneto-optical recording and/or reading-out apparatus capable of recording information on a magneto-optical recording medium by used of a laser beam modulated at any one of two levels, said apparatus comprising;
an address detector for detecting an address;
a reflected beam detector, operatively coupled with said address detector, for detecting a change in intensity of a laser beam reflected from said magneto-optical recording medium;
a sampling means, operatively coupled with said reflected beam detector, for sampling an output level of said reflected laser beam when said laser beam is modulated only at one of said two levels;
a comparator, operatively coupled with said sampling means, for comparing an output level of said reflected beam detector with at least one reference value; and
a judgment means, operatively coupled with said comparator, for judging whether an area of said magneto-optical recording medium which has caused an abnormality in output level of said comparator is practically usable, in reference to data to be recorded on said area, said abnormality indicating the existence of a defect in said area.

* * * * *

UNITED STATES PATENT AND TRADEMARK OFFICE
CERTIFICATE OF CORRECTION

PATENT NO.     : 5,341,359
DATED          : August 23, 1994
INVENTOR(S)    : Birukawa et al.

It is certified that error appears in the above-identified patent and that said Letters Patent is hereby corrected as shown below:

Column 19, line 43, then word "are" should be --area--.

Signed and Sealed this

Twenty-seventh Day of December, 1994

Attest:

BRUCE LEHMAN

Attesting Officer     Commissioner of Patents and Trademarks